United States Patent
Mu et al.

(10) Patent No.: US 11,917,005 B2
(45) Date of Patent: Feb. 27, 2024

(54) CLUSTERED STORAGE SYSTEM SYNCHRONIZATION

(71) Applicant: NetApp Inc., Sunnyvale, CA (US)

(72) Inventors: Yuedong Mu, San Jose, CA (US); Ching-Yuk P. Ngan, Redwood City, CA (US); Manoj V. Sundararajan, Sunnyvale, CA (US)

(73) Assignee: NetApp, Inc., San Jose, CA (US)

( * ) Notice: Subject to any disclaimer, the term of this patent is extended or adjusted under 35 U.S.C. 154(b) by 302 days.

(21) Appl. No.: 16/162,850

(22) Filed: Oct. 17, 2018

(65) Prior Publication Data

US 2019/0052709 A1 Feb. 14, 2019

Related U.S. Application Data

(63) Continuation of application No. 14/472,943, filed on Aug. 29, 2014, now abandoned.

(51) Int. Cl.
 *H04L 67/1097* (2022.01)
(52) U.S. Cl.
 CPC .................. *H04L 67/1097* (2013.01)
(58) Field of Classification Search
 CPC ....... H04L 67/1097; H04L 9/40; H04L 67/01; H04L 67/02; H04L 67/025; H04L 67/04; H04L 67/06; H04L 67/08; H04L 67/10; H04L 67/1001; H04L 67/1004; H04L 67/1006; H04L 67/1008; H04L 67/101; H04L 67/1012; H04L 67/1014; H04L 67/1017; H04L 67/1019; H04L 67/1021; H04L 67/1023; H04L 67/1025; H04L 67/1027; H04L 67/1029; H04L 67/1031; H04L 67/1034; H04L 67/1036; H04L 67/1038; H04L 67/104; H04L 67/1042; H04L 67/1044; H04L 67/1046; H04L 67/1048; H04L 67/1051; H04L 67/1053;
 (Continued)

(56) References Cited

U.S. PATENT DOCUMENTS

| | | | |
|---|---|---|---|
| 5,546,582 | A | 8/1996 | Brockmeyer et al. |
| 5,884,327 | A | 3/1999 | Cotner et al. |

(Continued)

OTHER PUBLICATIONS

"A Quorum-Based Commit Protocol," Feb. 1982, Dale Skeen, 1982 Technical Report, 14 pages.
(Continued)

*Primary Examiner* — Kris E Mackes
*Assistant Examiner* — Soheila (Gina) Davanlou
(74) *Attorney, Agent, or Firm* — Cooper Legal Group, LLC

(57) ABSTRACT

A request to perform a coordinated action is received. The coordinated action comprises a first plurality of operations. In response to reception of the request to perform the coordinated action, a second plurality of operations is performed in preparation for performing the coordinated action. A response to the request to perform the coordinated action is sent. The response to the request to perform the coordinated action comprises an indication that the first device will perform the coordinated action. An indication that the coordinated action is to be performed is received. In response to reception of the indication that the coordinated action is to be performed, the first plurality of operations is performed.

20 Claims, 6 Drawing Sheets

(58) Field of Classification Search
CPC ............. H04L 67/1055; H04L 67/1057; H04L 67/1059; H04L 67/1061; H04L 67/1063; H04L 67/1065; H04L 67/1068; H04L 67/107; H04L 67/1072; H04L 67/1074; H04L 67/1076; H04L 67/1078; H04L 67/108; H04L 67/1082; H04L 67/1085; H04L 67/1087; H04L 67/1089; H04L 67/1091; H04L 67/1093; H04L 67/1095; H04L 67/12; H04L 67/125; H04L 67/131; H04L 67/133; H04L 67/1396; H04L 67/2866; H04L 67/2869; H04L 67/2871; H04L 67/2876; H04L 67/288; H04L 67/2885; H04L 67/289; H04L 67/2895; H04L 67/30; H04L 67/303; H04L 67/306
See application file for complete search history.

(56) References Cited

U.S. PATENT DOCUMENTS

| | | | |
|---|---|---|---|
| 6,363,401 B2 | 3/2002 | Yahya et al. | |
| 7,092,940 B1 | 8/2006 | Ethen et al. | |
| 7,478,099 B1* | 1/2009 | Gandhi | G06F 16/23 |
| 7,725,445 B2 | 5/2010 | Hirakawa et al. | |
| 9,135,120 B1 | 9/2015 | Natanzon | |
| 9,772,909 B1* | 9/2017 | Xing | G06F 11/1469 |
| 2004/0044865 A1* | 3/2004 | Sicola | G06F 11/2007 |
| | | | 711/162 |
| 2007/0027964 A1* | 2/2007 | Herrod | H04L 41/0806 |
| | | | 709/220 |
| 2007/0195810 A1 | 8/2007 | Fachan | |
| 2009/0138522 A1 | 5/2009 | Day, III et al. | |
| 2010/0199042 A1 | 8/2010 | Bates et al. | |
| 2011/0138475 A1* | 6/2011 | Gordon | H04L 9/085 |
| | | | 726/26 |
| 2013/0117766 A1* | 5/2013 | Bax | G06F 9/4401 |
| | | | 719/323 |
| 2013/0346720 A1* | 12/2013 | Colgrove | G06F 3/0608 |
| | | | 711/165 |
| 2015/0261782 A1* | 9/2015 | McFerrin | G06F 3/06 |
| | | | 707/625 |
| 2016/0043894 A1* | 2/2016 | Chennamsetty | H04L 41/0672 |
| | | | 370/221 |

OTHER PUBLICATIONS

Non-Final Office Action cited in U.S. Appl. No. 14/472,943 dated Sep. 16, 2016, 22 pgs.
Reply Non-Final Office Action cited in U.S. Appl. No. 14/472,943 dated Dec. 13, 2016, 12 pgs.
Final Office Action cited in U.S. Appl. No. 14/472,943 dated Apr. 12, 2017, 23 pgs.
Reply Final Office Action cited in U.S. Appl. No. 14/472,943 dated Jun. 12, 2017, 11 pgs.
Non-Final Office Action cited in U.S. Appl. No. 14/472,943 dated Dec. 13, 2017, 21 pgs.
Reply Non-Final Office Action cited in U.S. Appl. No. 14/472,943 dated Feb. 23, 2018, 11 pgs.
Final Office Action cited in U.S. Appl. No. 14/472,943 dated Jul. 18, 2018, 18 pgs.
Reply Final Office Action cited in U.S. Appl. No. 14/472,943 dated Sep. 18, 2018, 12 pgs.

* cited by examiner

CLUSTERED STORAGE SYSTEM SYNCHRONIZATION

RELATED APPLICATION

This application claims priority to and is a continuation of U.S. patent application Ser. No. 14/472,943, filed on Aug. 29, 2014 and titled "CLUSTERED STORAGE SYSTEM SYNCHRONIZATION," which is incorporated herein by reference.

BACKGROUND

Aspects of the disclosures herein generally relate to the field of storage systems, and, more particularly, to performing coordinate actions within a clustered storage system. Clustered storage systems allow for scalability, flexibility, and data redundancy. When greater performance is needed, new nodes can be added. When a node becomes unavailable, data can be recreated on another node. When an entire cluster in unavailable, a secondary cluster can be used.

Clustered storage systems are generally configured to appear as one or more storage objects (e.g., storage devices, volumes, partitions, etc.). While one of these storage objects may appear to a client as a single device, the actual data may be spread across multiple nodes and multiple storage devices within each node.

BRIEF DESCRIPTION OF THE DRAWINGS

The disclosures herein may be better understood by referencing the accompanying drawings.

DESCRIPTION OF EXAMPLE ILLUSTRATION(S)

Figure 1:
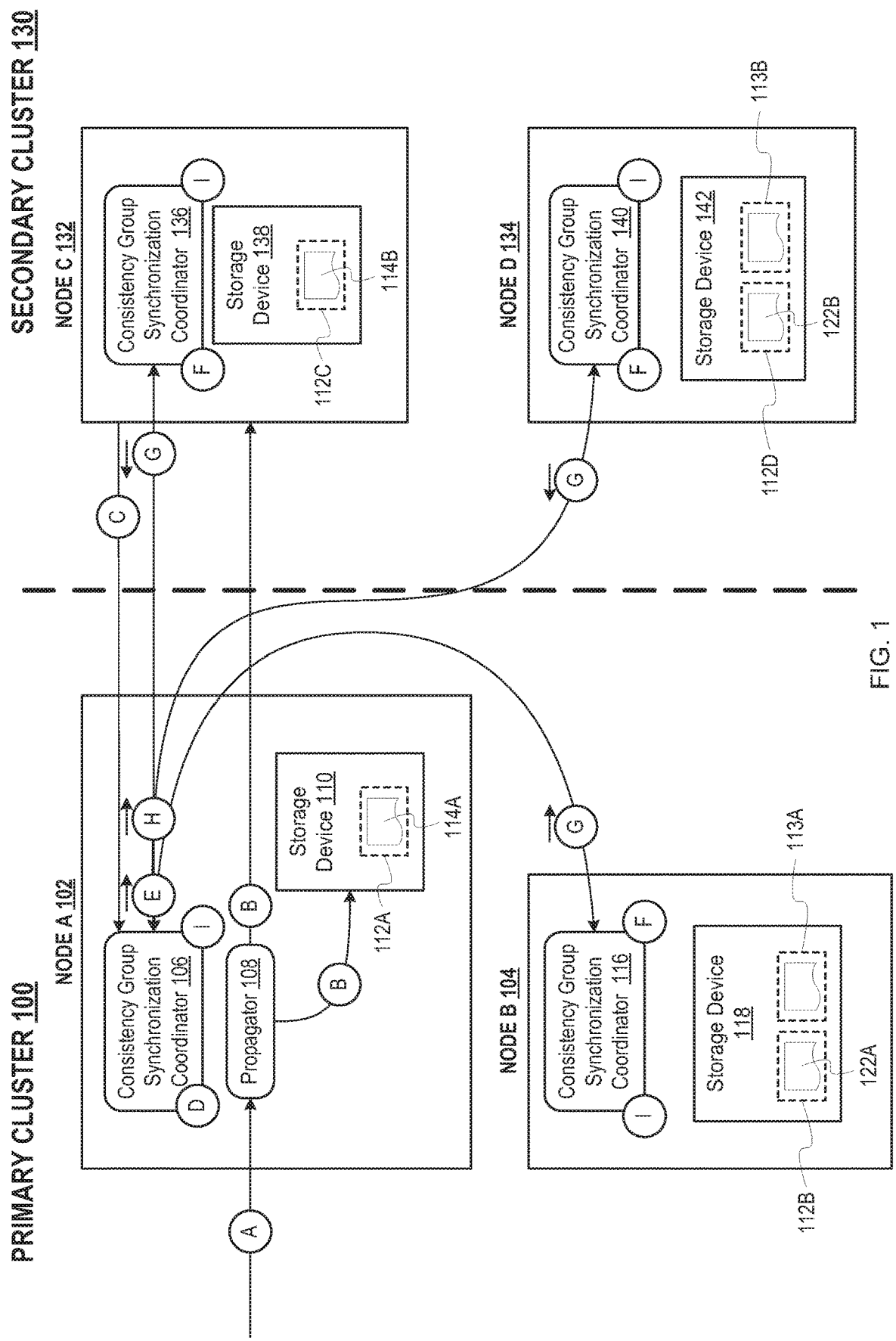
FIG. 1 depicts the operation of a storage system with consistency group synchronization coordinators.

The description that follows includes example systems, methods, techniques, instruction sequences and computer program products that embody techniques of the disclosures herein. However, it is understood that the described disclosures may be practiced without these specific details. For instance, although examples refer to write commands, the disclosures apply to other types of input/output commands. In other instances, well-known instruction instances, protocols, structures and techniques have not been shown in detail in order not to obfuscate the description.

Clustered storage system (hereinafter "storage system") configurations can vary greatly. The example illustrations herein, however, refer to an example storage system configuration to avoid complicating the disclosures with the variety of storage system configurations. It should be noted, however, that the disclosures herein are not limited to the example configuration. Some variations to the example storage system configuration will be described below as appropriate, but do not encompass all configuration variations.

Example Storage System Configuration

The example storage system configuration described herein includes a set of two or more primary nodes. Each primary node provides a consistent view of the storage system, allowing a client to send input/output (I/O) commands to any primary node within the cluster. Each primary node includes one or more storage devices.

The storage available on the storage devices is aggregated into a pool of storage. In other words, although there may be multiple storage devices, the nodes present a single storage pool that includes all space available on the storage devices. An administrator can then divide the storage pool into volumes, virtual disks, etc. Some portion of the storage is reserved for storage system metadata.

Clients of the storage system see the storage system as configured by the administrator. Thus, if the administrator divides the storage pool into two different volumes, a client can be configured to connect to one or both volumes as if they were, essentially, individual storage devices. The actual arrangement of data on the storage devices is handled by the nodes themselves, possibly with some direction from an administrator. The nodes can thus store data for a particular volume on any storage device within the storage system. For example, although a single volume might appear to a client to be located on a single drive, the actual data might be stored across many different nodes and many different storage devices.

Instead of requiring clients to send I/O commands to the node that is associated with the actual storage device on which the data is located, the nodes can forward I/O commands to the appropriate node. For example, if node A receives an I/O command that references data stored on a storage device associated with node B, node A forwards the I/O command to node B.

The data hosted across the storage system can be grouped into consistency groups. Features such as dependent write ordering, atomic transactions, and the like are generally managed at a volume level. However, consistency groups allow those features to span multiple volumes. Thus, dependent write ordering can be applied across multiple volumes, for example. Because the underlying data is spread across multiple nodes, consistency groups span multiple nodes as well. Thus, the consistency group is divided into consistency group endpoints (hereinafter "endpoints") that exist on single nodes. For example, a consistency group spread across two nodes has an endpoint on each node.

In addition to the two primary nodes, the example storage system configuration includes a set of two or more secondary nodes. Each endpoint on a primary node ("primary endpoint") is replicated to an endpoint on a secondary node ("secondary endpoint"), which acts as a "backup". The collection of primary nodes forms a primary cluster while the collection of secondary nodes forms a secondary cluster. The actual replication can be configured in a variety of ways. As a first example, the secondary nodes can mirror the primary nodes. In other words, a particular primary node replicates all of its primary endpoints to the same secondary node. As another example, a secondary endpoint can exist on any of the secondary nodes. When replicating the data from a primary endpoint, a primary node determines which node is associated with the secondary endpoint. This allows the secondary endpoint to be migrated between secondary nodes.

Under normal operation, the primary nodes replicate changes to data to the appropriate secondary endpoint. Thus, if connectivity with the primary cluster is lost, clients can communicate with the secondary cluster, which will have an accurate representation of the data stored on the primary cluster (at least up to the last replicated change). For example, consider a scenario in which the primary cluster is located in a first geographic area and the secondary cluster is located in a second geographic area. If a natural disaster occurs in the first geographic area (e.g., an earthquake, hurricane, etc.) that causes a power outage or otherwise severs communication with the primary cluster, the clients can begin communicating with the secondary cluster instead, which are located in an unaffected geographic area. For the purposes of the examples discussed herein, it is assumed that clients only communicate directly with the primary cluster and that the primary cluster does not become unavailable for the duration of the example illustrations.

Cluster Coordination Example

The constituent nodes of a storage system generally perform certain actions or operations in a coordinated fashion. For example, consider consistency points. A node creates a consistency point by flushing (i.e., writing) data from temporary storage, such as cache, to a storage device. If a failure occurs, the data stored on the storage device is up-to-date as of the time of the consistency point creation.

Consider, however, a scenario in which a consistency group encompasses a single large file and the consistency group has two endpoints, each on different nodes. If a client issues a write command that changes data at both endpoints, each node updates the consistency point data associated with the respective endpoint. Now assume that a first of the nodes creates a consistency point but the second does not. If a failure occurs before the second node creates a consistency point, only the changes to the endpoint on the first node will be available. In other words, only half of the data modified by the write command will actually be recoverable. However, if both nodes create consistency points at the same time, the changed data will be preserved. In other words, coordinating the creation of the consistency point can maintain the atomicity of a write operation.

To coordinate creating consistency checkpoints, changing states, and performing other coordinated actions, a synchronization coordinator implements a two-phase communication protocol. An initiator node sends a message to one or more receiving nodes requesting the availability of the receiving nodes to perform a particular coordinated operation. The receiving nodes each send a response message indicating whether the respective node can or cannot perform the coordinated operation. If the receiving nodes (or a subset of the receiving nodes) can perform the coordinated operation, the initiating node sends a second message to the receiving nodes indicating that the coordinated operation should be performed.

When a receiving node receives the request for availability, the receiving node determines whether the receiving node can perform the operations to effectuate the coordinated actions. The receiving node can also perform one or more operations in preparation for the coordinated action, such as fencing I/O commands and responses. After receiving the second message, the receiving node can perform the coordinated action. The receiving node might also perform one or more operations after performing the coordinated actions, such as unfencing I/O commands and responses.

Example Illustrations

FIG. 1 depicts the operation of a storage system with consistency group synchronization coordinators. FIG. 1 depicts a storage system that includes a primary cluster 100 and a secondary cluster 130. The primary cluster 100 includes two nodes, node A 102 and node B 104. Node A 102 includes a consistency group synchronization coordinator (hereinafter "sync coordinator") 106, a propagator 108, and a storage device 110. Node B 104, node C 132, and node D 134 include sync coordinators 116, 136, and 140 respectively. Node B 104, node C 132, and node D 134 also include storage devices 118, 138, and 142 respectively.

The storage system is configured similarly as the example storage system configuration described above. In particular, clients (not depicted) communicate with the primary cluster 100 unless the primary cluster 100 becomes unavailable. If the primary cluster 100 becomes unavailable, the clients communicate with the secondary cluster 130. Each of the nodes includes an endpoint for a first consistency group. In particular, storage device 110 of node A 102 includes consistency group endpoint (hereinafter "endpoint") 112A; storage device 118 of node B 104 includes endpoint 112B; storage device 138 of node C 132 includes endpoint 112C; and storage device 142 of node D 134 includes endpoint 112D. Node B 104 and node D 134 also include endpoints for a second consistency group: storage device 118 of node B 104 includes endpoint 113A and storage device 142 of node D 134 includes endpoint 113B.

The first consistency group includes a first data set and a second dataset. The first data set, referred to herein as data set 114, includes primary data set copy 114A and secondary data set copy 114B, stored on storage device 110 and storage device 138, respectively. The second data set, referred to herein as data set 122, includes primary data set copy 122A and secondary data set copy 122B, stored on storage device 118 and storage device 142, respectively.

Each node of the primary cluster 100 can receive I/O commands associated with either data set 114 or 122. If an I/O command is associated with a data set stored on a different node, the I/O command is forwarded to the correct node. If the I/O command results in a change to data or metadata of either data set 114 or 122, the change is replicated to the appropriate node in the secondary cluster 130.

Stages A-I depict operations for synchronizing a state change among nodes of a storage system. In particular, the storage system receives a write command. An error occurs while replicating the write command, resulting in a coordinated state change to an error state.

At stage A, node A 102 receives a write command from a client (not depicted). The write command includes the data to write as well as an indication of the location that the data should be written to. The location can be specified as a virtual or physical address. If the location is a virtual address, node A 102 can translate the virtual address into one or more physical addresses. Node A 102 can also split the write command into multiple write commands if the write command references data that is split among more than one location. In this example, the write command indicates that the data should be written to a location associated with data set 114.

At stage B, node A 102 determines that the write command indicates that the data should be written to a location associated with data set 114. Node A 102 also determines that data set 114 is stored on storage device 110 (i.e., node A 102 determines that node A 102 is the correct node). The propagator 108 determines that data set 114 belongs to the first consistency group and that the first consistency group is replicated to a secondary node. In response to the determination that the first consistency group is replicated, propagator 108 generates two write commands based on the received write command: write command A and write command B. Because data set 114 is stored on storage device 110, the propagator 108 sends write command A to storage device 110. Node A 102, via the propagator 108 or another component, also determines that node C 132 includes the secondary location for data set 114 and sends write command B to node C 132.

At stage C, node C 132 sends an error indication to the sync coordinator 106 indicating that a failure occurred while processing write command B. A failure could result from a variety of scenarios, including data corruption during transmission, a failure to write the data to the storage device 138, etc. The error indication can include an I/O command identifier that associates the error indication with the particular I/O command (write command B in this example). The error indication can also include an error type or include additional data that might be used to handle the error. Node A 102 typically receives the error indication and passes the error indication to the sync coordinator 106.

The error indication will typically include information that allows the sync coordinator 106 to determine that the error indication is associated with a particular consistency group. In this particular example, the error indication resulted from write command B, which was associated with the first consistency group. The error indication itself might identify the first consistency group. The sync coordinator 106 might have access to metadata associated with the I/O commands. Thus, if the error indication provides an identifier that identifies write command B, the sync coordinator 106 can look up the metadata associated with write command B. The metadata can identify the first consistency group itself or provide data that allows the sync coordinator 106 to otherwise determine that write command B was associated with the first consistency group.

At stage D, sync coordinator 106 determines that nodes associated with the first consistency group should change state in a coordinated fashion based on the error indication received at stage C. The sync coordinator 106 can include a list of errors or other operations that can result in a coordinated state change or other coordinated operation(s). The list can also map the particular error or operation with an indication of the particular coordinated state change or operation(s) that should result from the particular error or operation. Thus, for example, the sync coordinator might find the error indication in the list and determine, based on a mapping in the list, that the nodes associated with the first consistency group should change state to an error state. In some configurations, the particular errors or operations are hardcoded as part of the sync coordinator 106 or an associated component. For example, the sync coordinator 106 might execute one or more particular blocks of program code based on the error type.

Sync coordinator 106 also determines which nodes are associated with the first consistency group. To determine which nodes are associated with the first consistency group, the sync coordinator 106 can look up the first consistency group in a table that identifies the endpoints for consistency groups. In this particular example, the sync coordinator 106 determines that the first consistency group includes endpoints 112A, 112B, 112C, and 112D. The sync coordinator 106 also determines on which nodes the endpoints 112A, 112B, 112C, and 112D exist. In this case, the sync coordinator 106 determines that node A 102, node B 104, node C 132, and node D 134 each contain an endpoint for the first consistency group. The sync coordinator 106 might not actually determine anything regarding endpoint 112A since endpoint 112A is on node A 102 (the node that includes the sync coordinator 106). In other words, the sync coordinator 106 can, at least in some instances, assume that the node on which the sync coordinator 106 is operating includes an endpoint for the particular consistency group at issue.

At stage E, the sync coordinator 106 sends a request for availability to perform the coordinated state change to each of the nodes determined to host endpoints (node B 104, node C 132, and node D 134; collectively "receiving nodes"). The request for availability identifies the particular coordinated state change (in this example, a change to an error state). The request for availability can be sent as a broadcast message to nodes of the primary cluster 100 and the secondary cluster 130 or only to the identified nodes. If sent as a broadcast message, the request for availability can identify the relevant nodes, thus allowing irrelevant nodes to ignore the request for availability. In this example, the request for availability flows to the sync coordinator of each respective node.

At stage F, the respective sync coordinators of the receiving nodes determine whether the particular node is capable of coordinated state change and performs operations to prepare for performing the coordinated state change. The particular operations performed by the receiving nodes can vary depending on the particular state change, storage system characteristics, node characteristics, etc. For example, if the state change results in the allocation or use of additional memory, a receiving node with too little available memory may not be capable of performing the coordinated state change. As another example, a receiving node might have already received a request for availability to perform another coordinated state change that conflicts with the current coordinated state change. The sync coordinator 106 can perform a check to verify that node A 102 is capable of performing the coordinated state change as well. This example assumes that all receiving nodes are capable of performing the coordinated state change.

The particular operations performed to prepare for the coordinated state change can vary similarly. If the state change is to an error state, the receiving nodes queue any incoming or unperformed I/O commands that reference the first consistency group. In addition to queuing any incoming or unperformed I/O command, the receiving nodes can queue responses to I/O commands that reference the first consistency group that were in progress when the request for availability was received. By holding responses to I/O commands, the receiving nodes prevent dependent writes from issuing from clients.

Although the operations performed to prepare for the coordinated state are described as being performed after determining that the respective receiving nodes can perform the coordinated state change, the receiving nodes can perform the operations prior to making the determination. In other words, after receiving the request for availability, a receiving node might begin queuing incoming I/O commands and queuing responses prior to actually performing the operations to determine whether the receiving node can actually perform the coordinated state change.

At stage G, the respective sync coordinators of the receiving nodes send a reply to the sync coordinator 106. Each receiving node replies to the request for availability by sending a message back to the sync coordinator 106 indicating the outcome of the determination. The reply message can include an identifier associated with the request for availability along with an indication of the outcome of the determination.

At stage H, the sync coordinator 106 determines that each receiving node has replied affirmatively to the request for availability and sends a message indicating that each receiving node should perform the coordinated state change. Similar to the request for availability, the message to perform the coordinated state change can be a broadcast message that specifies the relevant nodes or be individual messages specifically sent to each of the relevant nodes. The message can identify the particular state change (e.g., to an error state) or can include an identifier that links the message to the previous request for availability, thus identifying the state change by reference.

At stage I, the sync coordinators of the receiving nodes receive the message to perform the coordinated state change and perform the coordinated state change. The sync coordinator 106 also performs the coordinated state change (if not already performed). The specific operations performed to effectuate the coordinated state change can vary between storage systems, nodes, or particular state changes.

Take, for example, sync coordinator 116 of node B 104. Sync coordinator 116 can set a status variable associated with the first consistency group that indicates that the first consistency group is in an error state. Thus, node B 104 can return an error in response to any I/O commands received after the status variable is set. The sync coordinator 116 can also send messages to known clients (or a single broadcast message) indicating that the status of the first consistency group has changed.

As described above, the sync coordinator 116 (along with other receiving node sync coordinators) performed operations to prepare for the coordinated state change. In this particular example, the sync coordinator 116 queued responses to any I/O commands that referenced the first consistency group and queued any received I/O commands that referenced the first consistency group. Once the message indicating that the coordinated state change should be performed is received, the sync coordinator 116 can perform operations to handle the queued responses and queued I/O commands. For example, if any of the responses that were queued were associated with I/O commands that changed data, the sync coordinator 116 can roll back the changes made and return error responses. Thus, if the I/O commands that generated the responses were dependent on the write command received at stage A, the error responses can ensure the preservation of the dependent write order. Further, the sync coordinator 116 can dequeue the queued I/O commands and generate error responses for the dequeued I/O commands.

The operations described at stages A-I are performed on a per-consistency-group basis. Thus, consistency groups other than the first consistency group might not be impacted by the operations. For example, consider the second consistency group, of which there are two endpoints 113A and 113B (on node B 104 and node D 134 respectively). If the failure that occurred at stage C was limited to node C 132, then the second consistency group would likely not be impacted because the second consistency group does not have an endpoint on node C 132. Thus, node A 102 and node B 104 can still receive and process I/O commands that reference the second consistency group.

The fact that the operations described at stages A-I are performed on a per-consistency-group basis does not limit the operations to one consistency group. For example, if node A 102 determined that it was incapable of communicating with node C 132, the sync coordinator 106 might perform the operations for all consistency groups that have endpoints on node C 132. Similarly, the operations might be performed at other levels of granularity as well. For example, if consistency groups are defined as being groups of files, the operations might be performed on a per-file basis. As another example, if consistency groups can be grouped together, the operations might be performed on groups of consistency groups.

Further, while FIG. 1 depicts a primary node as the initiator node (i.e., initiates the coordination of the state change), any node can be an initiator node. For example, consider a variation on the scenario depicted in FIG. 1. Instead of sending an error indication to node A 102 at stage C, node C 132 can act as the initiator node. While node C 132 will generally still indicate that an error occurred when processing a particular I/O command (at some point), node C 132 can become the initiator node. Thus, the process of coordinating the state change can begin as soon as possible, instead of waiting for the error indication to be received and processed by node A 102.

Additionally, although FIG. 1 depicts the error indication being sent from node C 132 to node A 102 (to the synchronization coordinator 106, in particular), the error indication can come from another component of the storage system. For example, if a network failure occurs, a networking component might generate the error and send it to node A 102. As another example, node A 102 might not receive a response from node C 132 within a certain time period and thus a component within node A 102 may notify the sync coordinator 106 that write command B timed out.

In some scenarios, a particular receiving node might determine, at stage F, that the receiving node is not capable of performing the coordinated state change. In such instances, the other receiving nodes will typically still change state. Thus, even if not all receiving nodes reply to a request for availability affirmatively, the sync coordinator 106 might still send a message indicating that the coordinated state change should still be performed. However, additional operations might be performed. For example, assume that node D 134 indicated that it could not perform the coordinated state change. Node A 102 (or another node/component of the storage system) might initiate operations to move the endpoint 112D off of node D 134 and onto another node.

It should also be noted that the sync coordinator 106 can function in conjunction with various components within node A 102. For example, the propagator 108 might replicate I/O commands in groups or batches to the secondary nodes. After the propagator sends a batch of I/O commands to the secondary nodes, the propagator 108 can notify the sync coordinator 106 that the batch of I/O commands should be committed synchronously among the secondary nodes. In response, the sync coordinator 106 can perform operations similar to those described above. For example, instead of indicating a state change as the coordinated action, the sync coordinator 106 can indicate that the coordinated action is to commit a particular batch of I/O commands. Thus, the sync coordinator 106 can act as a centralized component that performs synchronization functions for the various components within node A 102, including components not depicted.

Figure 2:
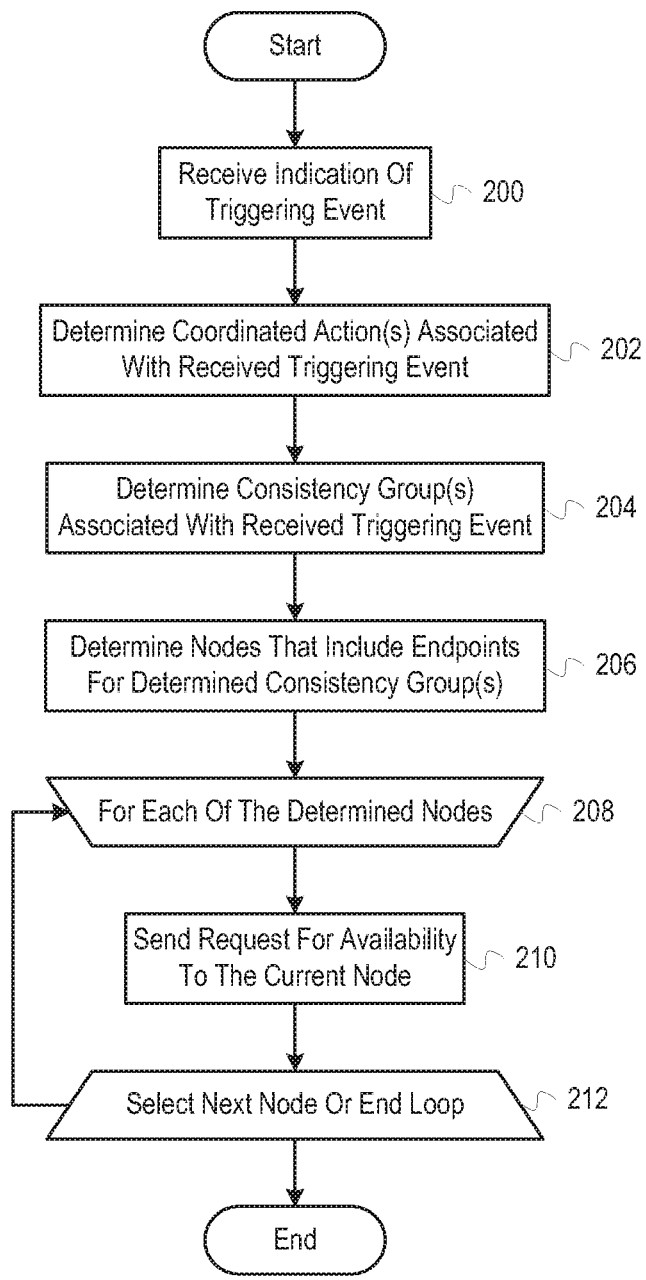
FIG. 2 depicts a flowchart of example operations for receiving replies to requests for availability and indicating to nodes that a coordinate action should be performed.

FIG. 2 depicts a flowchart of example operations for determining a set of nodes that are available to perform a coordinated action. The operations depicted in FIG. 2 can be performed by a sync coordinator, such as the sync coordinator 106 depicted in FIG. 1, or another component.

At block 200, a sync coordinator receives an indication of a triggering event. A triggering event is an event that should result in one or more coordinated actions being performed among a set of nodes. For example, consider a set of nodes that each contains endpoints for a consistency group. If replication of consistency group data from a primary node to a secondary node fails, the set of nodes should go into an error state together. As another example, to create a consistency point for the consistency group, each node of the set of nodes should create a local consistency point in conjunction with the other nodes of the set of nodes.

Generally, a node on which the sync coordinator is operating notifies the sync coordinator that a triggering event has occurred. For example, if a first node determines that a second node has either gone offline or come online, the first node can notify a sync coordinator operating on the first node of the particular event. Further, in some configurations, the sync coordinator can be operating on a component that is not part of a node. Further, in some configurations, the sync coordinator can be operating on a particular node component, such as a storage controller. Further, in some configurations the sync coordinator analyzes events and determines whether one or more of the events are triggering events itself.

The indication of the triggering event can include various pieces of data or metadata, such as an I/O command identifier, I/O command target identifier, event source identifier, etc. Generally, the indication of the triggering event contains data or metadata that allows the sync coordinator to perform the operations described herein, such as an error identifier. After the sync coordinator receives the indication of the triggering event, control then flows to block 202.

At block 202, the sync coordinator determines one or more coordinated actions that are associated with the received triggering event. The sync coordinator can determine the one or more coordinated actions by performing a lookup in a mapping table, querying a database, etc. In some configurations, the coordinated actions are hardcoded as part of the sync coordinator or associated component. For example, the sync coordinator might execute one or more particular blocks of program code based on the type of the received triggering event. After the sync coordinator determines the one or more coordinated actions that are associated with the received triggering event, control then flows to block 204.

At block 204, the sync coordinator determines one or more consistency groups associated with the received triggering event. Triggering events generally impact one or more consistency groups. For example, if data cannot be replicated to an endpoint of a particular consistency group, that consistency group is impacted by the triggering event (replication failure). If a node goes offline, all consistency groups with endpoints on the offline node are impacted by the triggering event (node going offline).

The technique used by the sync coordinator to determine the one or more consistency groups can vary. For example, if data cannot be replicated to a particular endpoint, the received indication of the triggering event can include an I/O command identifier that identifies a particular I/O command that failed to replicate. The sync coordinator can use the I/O command identifier to lookup metadata associated with the I/O command, including an indication of the data referenced by the I/O command. The sync coordinator can then use the metadata to determine the specific consistency group(s) associated with the I/O command. In some configurations, the received indication of the triggering event includes an indication of the one or more consistency groups directly. For example, if a first node determines that a second node has gone offline, the first node can determine which consistency groups had endpoints on the second node and then notify the sync coordinator that the node is offline or that endpoints associated with the particular consistency groups are no longer available. After the sync coordinator determines the one or more consistency groups associated with the received triggering event, control then flows to block 206.

At block 206, the sync coordinator determines the set of nodes that include endpoints for the determined consistency groups. The technique used to determine the set of nodes that include endpoints for the determined consistency groups can vary. For example, the sync coordinator might access a mapping table that maps consistency groups to nodes that contain endpoints of the determined consistency groups. As another example, the sync coordinator might query a database to determine the nodes that contain endpoints of the determined consistency groups. Further, the received indication of the triggering event can identify the nodes that contain endpoints of the consistency groups. After the sync coordinator determines the set of nodes that include endpoints for the determined consistency groups, control then flows to block 208.

At block 208, a loop begins in which the sync coordinator sends a request for availability to each of the determined set of nodes. The sync coordinator initializes the loop by selecting a first node from the determined set of nodes, which becomes the current node of the loop. During the loop, the sync coordinator selects a node from the sets of nodes and sends a request for availability to the selected node. On subsequent passes through block 208, the sync coordinator can update any values used during the loop. After the sync coordinator initializes the new loop or updates the loop values, control then flows to block 210.

At block 210, the sync coordinator sends a request for availability to the current node of the determined set of nodes. The request for availability indicates to the current node that the one or more coordinated actions determined at block 202 are to be performed. Thus, the request for availability can include one or more indications of the particular coordinated actions. The request for availability can include additional data, such as the consistency groups that are impacted, identification of the other nodes in the determined set of nodes, identification of the triggering event, etc. The sync coordinator typically sends the request for availability over one or more networks that communicatively couple the node on which the sync coordinator is operating and the current node. After the sync coordinator sends the request for availability to the current node, control then flows to block 212.

At block 212, the sync coordinator selects a new node of the determined set of nodes and sets the new node to be the current node or, if all nodes of the determined set of nodes have been iterated over, ends the loop. If the loop does not end, the sync coordinator can also mark the previous node as having been iterated over. In some configurations, however, marking of the previous node is not used. If less than all nodes of the determined set of nodes have been iterated over, control flows back to block 208. If all nodes of the determined set of nodes have been iterated over, the process ends.

Figure 3:
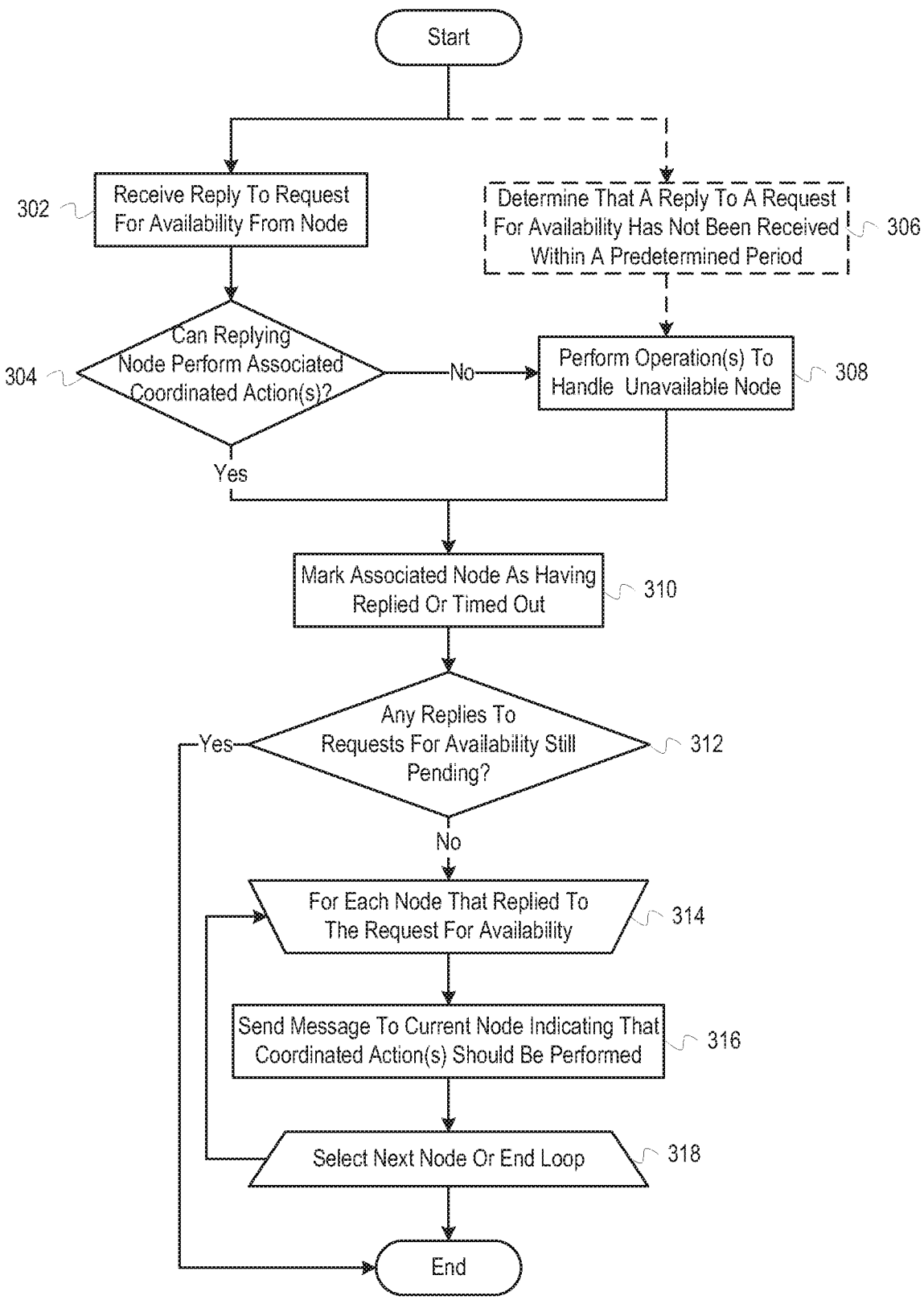
FIG. 3 depicts a flowchart of example operations for receiving replies to requests for availability and indicating to nodes that a coordinate action should be performed.

FIG. 3 depicts a flowchart of example operations for receiving replies to requests for availability and indicating to nodes that a coordinated action should be performed. The operations depicted in FIG. 3 can be performed by a sync coordinator, such as the sync coordinator 106 depicted in FIG. 1, or another component. The process depicted in FIG. 3 can begin at either block 302 or block 306. If a sync coordinator receives a reply to a request for availability from a node, the process begins at block 302. If the sync coordinator determines that a time out has occurred, the process begins at block 306.

At block 302, a sync coordinator receives a reply to a request for availability from a node. The reply to the request for availability indicates whether the particular node is capable of performing a particular coordinated action, as described above. The sync coordinator can receive the reply to the request for availability over a network that communicatively couples a node that the sync coordinator is operating on and the node that sends the reply. The reply can identify the replying node, identify the particular request for availability being replied to, and indicate whether the replying node can perform one or more coordinated actions. After the sync coordinator receives the reply to the request for availability from the node, control then flows to block 304.

At block 304, the sync coordinator determines whether the reply to the request for availability indicates that the node can perform the associated coordinated action (i.e., the coordinated actions specified in the request for availability). To determine whether the reply to the request for availability indicates that the node can perform the coordinated action, the sync coordinator can read a value from the reply to the request for availability. For example, a particular bit might be set to "1" or field set to "true" to indicate that the node can perform the coordinated action. Thus, the sync coordinator can read the particular value from the reply to the request for availability and compare the value to a predetermined value that indicates an affirmative reply. If the sync coordinator determines that the reply to the request for availability indicates that the node cannot perform the coordinated action, control then flows to block 308. If the sync coordinator determines that the reply to the request for availability indicates that the node can perform the coordinated action, control then flows to block 310.

At block 306, the sync coordinator determines that a reply to a request for availability has not been received within a predetermined period of time. In other words, the sync coordinator determines that a timeout has occurred. The sync coordinator itself can track the amount of time that has elapsed since a request for availability was sent to the relevant node. If the amount of time that has elapsed is greater than the predetermined period of time, the sync coordinator determines that the reply has timed out. One or more other components can also determine whether the reply to the request for availability has not been received within the predetermined period of time. For example, a networking component might notify the sync coordinator that no reply was received from the particular node after the time period has passed. After the sync coordinator determines that the reply to the request for availability has not been received within the predetermined amount of time, control then flows to block 308.

Control flowed to block 308 if it was determined, at block 304, that the reply to the request for availability indicates that the replying node cannot perform the one or more coordinated actions. Control also flowed to block 308 from block 306. At block 308, the sync coordinator performs one or more operations for handling unavailable nodes. The specific operations performed by the sync coordinator can vary depending on the storage system configuration, node configuration, reason for unavailability, etc. For example, if the node is incapable of performing the coordinated action, the endpoints might be migrated from the unavailable node to another node. If the node did not reply within the predetermined period (i.e., timed out), new endpoints might be created based on in-sync primary endpoints or secondary endpoints. In other words, instead of migrating an existing endpoint from one node to another, an existing endpoint might be duplicated on a different server. After the sync coordinator performs the one or more operations for handling unavailable nodes, control then flows to block 310.

Control flowed to block 310 if it was determined, at block 304, that the reply to the request for availability indicates that the replying node can perform the coordinated action. Control also flowed to block 310 from block 308. At block 310, the sync coordinator marks the node associated with the request for availability as having replied or timed out. In some configurations, the sync coordinator indicates specifically that the node replied or timed out. In some configurations, the sync coordinator does not indicate which of the two actually occurred, merely indicating that one of the two possibilities occurred. The sync coordinator can mark the node by setting a value in a data structure used to track the replies to the requests for availability, querying a database, etc. The sync coordinator might not make a mark specific to the node, but might track the outstanding requests themselves. For example, the sync coordinator might put an indication of the request for availability in a queue when the request for availability is sent. When a reply to a request for availability is received or a timeout occurs, the associated indication can be removed from the queue. The sync coordinator can also track the requests for availability by incrementing a counter when each request for availability is sent and decrementing the counter when a reply to a request for availability is received or times out. After the sync coordinator marks the node associated with the request for availability as having replied or timed out, control then flows to block 312.

At block 312, the sync coordinator determines whether any replies to the requests for availability are still pending. In other words, the sync coordinator determines whether any requests for availability are still pending. The technique used by the sync coordinator to determine whether any requests for availability are still pending can vary based on how the requests for availability are tracked. For example, the sync coordinator can analyze a data structure used to track the requests for availability, determine whether a queue is empty, determine whether a counter is at 0, etc. If the sync coordinator determines that no replies to requests for availability are still pending, control then flows to block 314. If the sync coordinator determines that some replies to requests for availability are still pending, the process ends.

At block 314, a loop begins in which the sync coordinator sends a message indicating that a coordinated action should be performed to each node that replied affirmatively to a request for availability. The sync coordinator initializes the loop by selecting a first node from the set of nodes that replied affirmatively to the request for availability. The first node becomes the current node of the loop. During the loop, the sync coordinator sends a message to the current node indicating that the coordinated action should be performed. On subsequent passes through block 314, the sync coordinator can update any values used during the loop. After the sync coordinator initializes the new loop or updates the loop values, control then flows to block 316.

At block 316, the sync coordinator sends a message indicating that a coordinated action should be performed to the current node. The specific coordinated action may have been determined previously, as described above at block 202 of FIG. 2. The message indicates to the current node that the coordinated action is to be performed. Thus, the message can include an indication of the particular coordinated actions. The message can include an identifier that identifies the request for availability associated with the message. The sync coordinator typically sends the message over one or more networks that communicatively couple the node on which the sync coordinator is operating and the current node. After the sync coordinator sends the message to the current node, control then flows to block 318.

At block 318, sync coordinator selects a new node of the set of nodes and sets the new node to be the current node or, if all nodes of the set of nodes have been iterated over, ends the loop. If the loop does not end, the sync coordinator can also mark the previous node as having been iterated over. In some configurations, however, marking of the previous node is not used. If less than all nodes of the set of nodes have been iterated over, control flows back to block 314. If all nodes of the set of nodes have been iterated over, the process ends.

Figure 4:
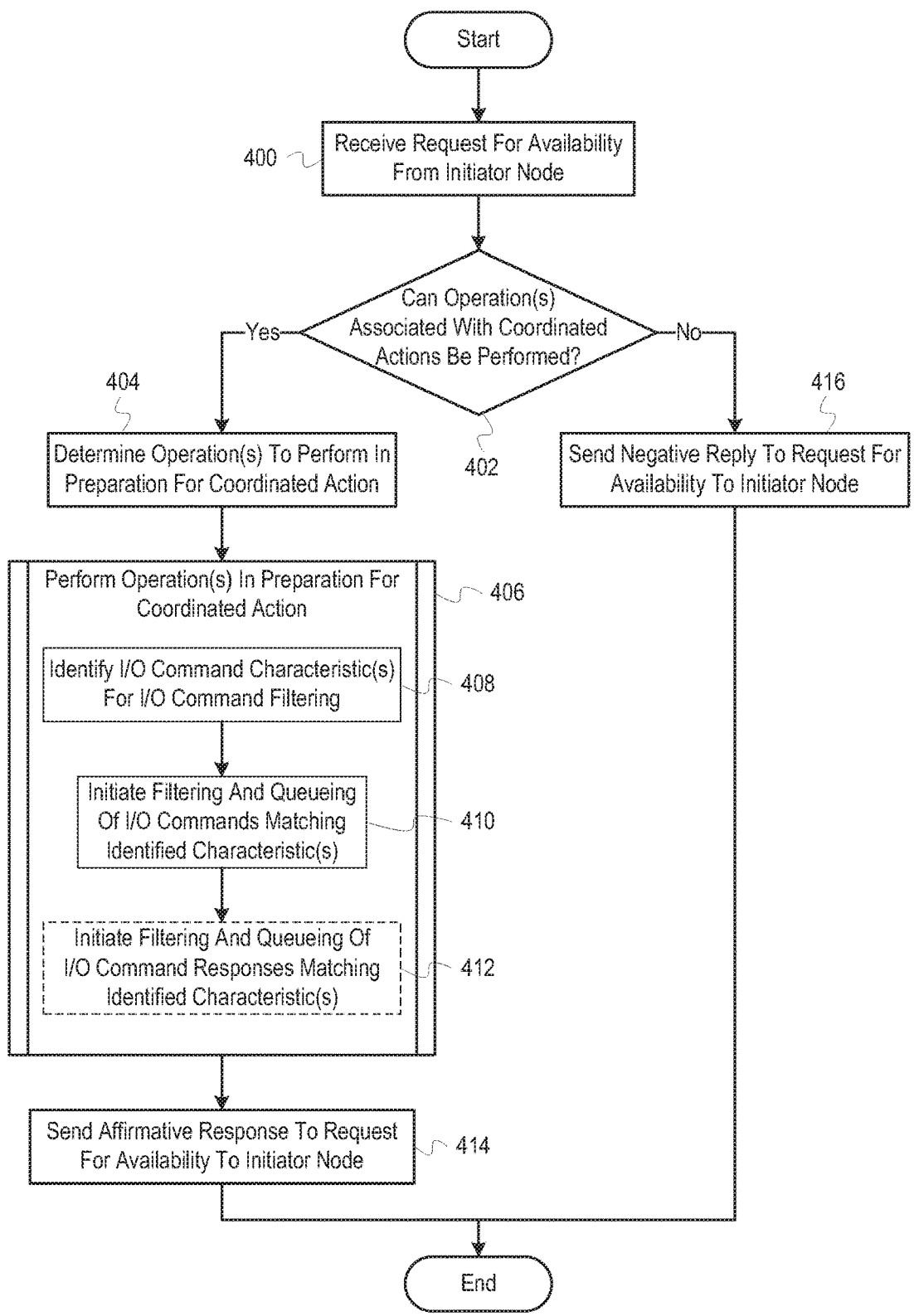
FIG. 4 depicts a flowchart of example operations for receiving a request for availability and performing one or more operations to prepare for a coordinated action.

FIG. 4 depicts a flowchart of example operations for receiving a request for availability and performing one or more operations to prepare for a coordinated action. The operations depicted in FIG. 4 can be performed by a sync coordinator, such as the sync coordinator 106 depicted in FIG. 1, or another component. The node on which the sync coordinator is operating is referred to as the "receiving node" and the node sending the request for availability is referred to as the "initiator node".

At block 400, a sync coordinator receives a request for availability from an initiator node. The request for availability generally includes data that identifies the particular coordinated action that will be performed, thus allowing the sync coordinator to determine which operations are performed to effectuate the coordinated action. The request for availability can also include data that identifies the request for availability itself, which can be used to identify related communications. The request for availability can also include data identifying the initiator node, one or more of the receiving nodes, affected consistency groups, etc. After the sync coordinator receives the request for availability from the initiator node, control then flows to block 402.

At block 402, the sync coordinator determines whether one or more operations associated with the coordinated action can be performed. In other words, the sync coordinator determines whether the receiving node is capable of performing the operations to effectuate the coordinated action. The sync coordinator first determines the operations that are to be performed, which can vary based on the particular coordinated action. Further, determining whether the operations can be performed can vary depending on the specific operations. For example, if the operations include allocating a certain amount of memory, the sync coordinator can determine whether there is sufficient memory to allocate for the operations. Similarly, if the operations include allocating space on a storage device, the sync coordinator can determine whether there is sufficient space available on the storage device to allocate for the operations. If the sync coordinator determines that the operations associated with the coordinated action can be performed, control then flows to block 404. If the sync coordinator determines that the operations associated with the coordinated action cannot be performed, control then flows to block 416.

At block 404, the sync coordinator determines one or more operations to perform in preparation for the coordinated action. The sync coordinator can determine the one or more operations by performing a lookup in a mapping table, querying a database, etc. In some configurations, the operations are hardcoded as part of the sync coordinator or an associated component. For example, the sync coordinator might execute one or more particular blocks of program code based on the particular coordinated action. After the sync coordinator determines the one or more operations to perform in preparation for the coordinated action, control then flows to block 406.

At block 406, the sync coordinator performs the one or more operations in preparation for the coordinated action. The specific operations performed can vary depending on the storage system configuration, node configuration, coordinated action, etc. For example, the sync coordinator can establish an I/O command fence. I/O commands received after the I/O command fence is established are put into a queue but not processed until the I/O command fence is removed. The I/O command fence allows the sync coordinator to perform operations to effectuate the coordinated action while the data stored within the storage system is in a consistent state (i.e., is not changing).

Blocks 408, 410, and 412 depict a set of example operations for establishing an I/O command fence. At block 408, the sync coordinator identifies one or more I/O command characteristics for use in filtering I/O commands. The specific characteristics can vary depending on the storage system configuration, node configuration, particular coordinated action, etc. For example, the sync coordinator can determine which consistency groups, files, volumes, etc. that the coordinated action applies to. As another example, the sync coordinator might determine that only particular I/O commands, such as write commands, should be filtered. The characteristics, or data allowing for the determination of the characteristics, can be indicated in the request for availability. For example, the request for availability might indicate a set of consistency groups. Or the request for availability might include a set of file identifiers that the sync coordinator can use to determine which consistency groups the files are part of. After the sync coordinator identifies one or more I/O command characteristics for use in filtering I/O commands, control then flows to block 410.

At block 410, the sync coordinator initiates filtering and queuing of I/O commands that match the identified characteristics. The particular operations performed to initiate filtering and queuing of the I/O commands can vary based on the storage system configuration, node configuration, etc. For example, the sync coordinator might provide the characteristics as parameters to one or more components that receive or process the I/O commands. As another example, the sync coordinator might indicate that I/O commands should be redirected to the sync coordinator, thus allowing the sync coordinator to filter and queue the I/O commands directly. After the sync coordinator initiates filtering and queuing of I/O commands, control then flows to block 412.

At block 412, the sync coordinator optionally initiates filtering and queuing of I/O command responses that match the identified characteristics. The particular operations performed to initiate filtering and queuing of I/O command responses can vary based on the storage system configuration, node configuration, etc. The particular operations can be similar to those used to initiate filtering and queuing of I/O commands. For example, the sync coordinator might provide the characteristics as parameters to one or more components that generate or send the I/O command responses. As another example, the sync coordinator might indicate that I/O command responses should be redirected to the sync coordinator, thus allowing the sync coordinator to filter and queue the I/O command responses directly.

The operation of initiating the filtering and queuing of I/O command responses is depicted as optional because some coordinated actions might not result in filtering and queuing the I/O command responses. Compare, for example, the scenarios of a state change due to a replication error and the creation of a consistency checkpoint. In some instances, write commands that are received after a replication error has occurred should fail as well, even if they otherwise could complete successfully. Thus, responses generated from write commands received after the replication error but before the state change takes place should be fenced, allowing the sync coordinator (or node generally) to send error responses instead. For consistency checkpoint generation, however, the storage system merely needs to be in a consistent state. Thus, responses to write commands received prior to the establishment of the fence can still be sent to clients. In other words, when generating a consistency checkpoint, preventing future changes until the consistency checkpoint is generated might be sufficient in some instances. After the sync coordinator optionally initiates filtering and queuing of I/O command responses, the subprocess ends and control then flows to block 414.

At block 414, the sync coordinator sends a response to the request for availability to the initiator node indicating that the one or more operations for effectuating the coordinated action can be performed. The response generally includes an indication identifying the receiving node and an indication that the coordinated action can be effectuated. The response can also include an indication that identifies the particular request for availability received at block 400. The response is generally transmitted over a network that communicatively couples the receiving node and the initiator node. After the sync coordinator sends the response to the initiator node, the process ends.

Control flowed to block 416 if it was determined, at block 402, that the one or more operations associated with the coordinated action cannot be performed. At block 416, the sync coordinator sends a response to the request for availability to the initiator node indicating that the one or more operations for effectuating the coordinated action cannot be performed. The response generally includes an indication identifying the receiving node and an indication that the coordinated action cannot be effectuated. The response can also include an indication that identifies the particular request for availability received at stage 400. The response is generally transmitted over a network that communicatively couples the receiving node and the initiator node. After the sync coordinator sends the response to the initiator node, the process ends.

Figure 5:
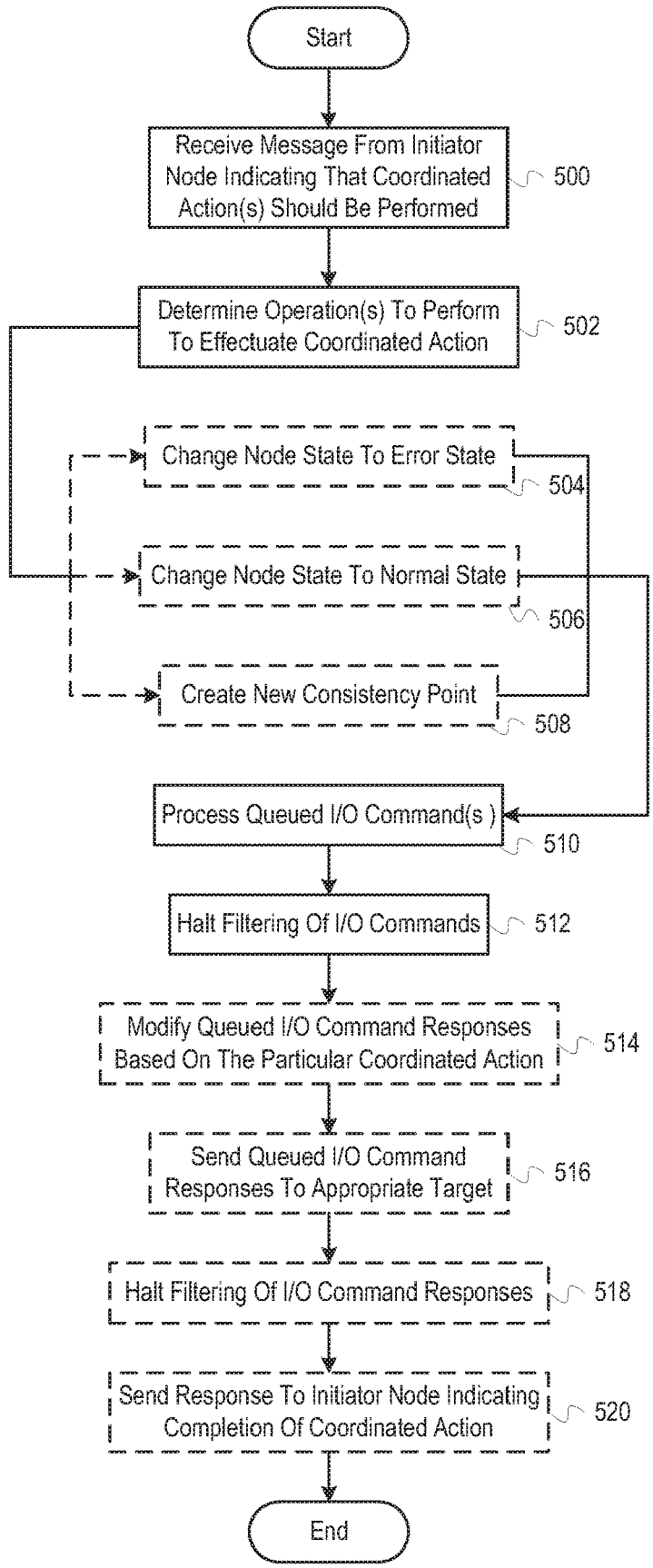
FIG. 5 depicts a flowchart of example operations for receiving a request for availability and performing one or more operations to prepare for a coordinated action.

FIG. 5 depicts a flowchart of example operations for receiving a request for availability and performing one or more operations to prepare for a coordinated action. The operations depicted in FIG. 5 can be performed by a sync coordinator, such as the sync coordinator 106 depicted in FIG. 1, or another component. The node on which the sync coordinator is operating is referred to as the "receiving node" and the node sending the request for availability is the "initiator node".

At block 500, a sync coordinator receives a message from an initiator node indicating that a coordinated action should be performed. The message generally includes data that identifies the particular coordinated action that will be performed, thus allowing the sync coordinator to determine which operations are performed to effectuate the coordinated action. The message can also include data that identifies the communications associated with the message. For example, the message might include an identifier that was originally sent with a request for availability, thus linking the particular request for availability with the message. The message can also include data identifying the initiator node, one or more of the receiving nodes, affected consistency groups, etc. After the sync coordinator receives the message from the initiator node, control then flows to block 502.

At block 502, the sync coordinator determines one or more operations to perform to effectuate the coordinated action. The sync coordinator can determine the one or more operations by performing a lookup in a mapping table, querying a database, etc. In some configurations, the operations are hardcoded as part of the sync coordinator or an associated component. For example, the sync coordinator might execute one or more particular blocks of program code based on the particular coordinated action. After the sync coordinator determines the one or more operations to perform to effectuate the coordinated action, control then flows to one of block 504, 506, or 508. If the coordinated action is to change the receiving node's state to an error state, control then flows to block 504. If the coordinated action is to change the receiving node's state to a normal state, control then flows to block 506. If the coordinated action is to create a new consistency point, control then flows to block 508.

At block 504, the sync coordinator changes the receiving node's state to an error state. To change the receiving node's state to an error state, the sync coordinator can call a particular function, send a message to another component identifying the error state, set a variable to a particular value, etc. In some storage systems, the nodes can have multiple error states, some of which might vary based on the specific configuration. For example, some storage systems might be configured to return an error in response to write commands received after a replication error. Some storage systems, on the other hand, might be configured to process write commands on a primary node even though the write commands cannot be replicated. Some storage systems might be configured to do either depending on the particular consistency group, volume, etc. Each of these options can be distinct error states, and others may be possible depending on the particular storage system. Further, as alluded to, the specific error state might not apply to the entire receiving node, instead being specified at a particular granularity. For example, each consistency group endpoint, volume, file, etc., can be associated with a particular error state distinct from other consistency group endpoints.

Additionally, other operations may be performed to change the state to an error state or in response to changing the state to an error state. For example, changing the state to an error state may result in notifications being sent to other components, allowing the other components to perform operations consistent with the error state. As another example, the sync coordinator itself might perform multiple operations itself, such as notifying components, setting status variables, changing data structures, etc. After the sync coordinator changes the receiving node's state to an error state, control then flows to block 510.

Control flowed to block 506 from block 502 if the coordinated action is to change the receiving node's state to a normal state. At block 506, the sync coordinator changes the receiving node's state to a normal state. The operations performed to change the receiving node's state to a normal state can be substantially similar to those described above at block 504. Similarly, there may be more than one normal state depending on the configuration of the storage system, node, etc., and the normal state can be specified at a particular granularity. After the sync coordinator changes the receiving node's state to a normal state, control then flows to block 510.

Control flowed to block 508 from block 502 if the coordinated action is to create a new consistency checkpoint. At block 508, the sync coordinator creates a new consistency checkpoint. As described above, creating a consistency point generally involves flushing changes from memory to an actual storage device to generate a consistent view of the data within the storage system. The specific operations performed to generate the consistency point can vary between configurations. For example, the sync coordinator might notify another component that the consistency point should be generated, thus allowing the other component to perform the operations. In some configurations, the sync coordinator might perform the operations itself including flushing the data stored in memory to the appropriate storage devices. After the sync coordinator creates a new consistency point, control then flows to block 510.

Control flowed to block 510 from blocks 504, 506, and 508. At block 510, one or more I/O commands that were queued after an I/O command fence was established are processed. The sync coordinator itself might process the I/O commands or might notify another component that the I/O commands can be processed. The particular component that processes the I/O commands and manner in which the I/O commands are processed can be related to the manner in which the queuing of the I/O commands is performed. For example, as described at block 410 of FIG. 4, the sync coordinator might filter and queue the I/O commands itself or might notify another component that the I/O commands should be filtered and queued. Generally, if the sync coordinator notifies another component to filter and queue the I/O commands, the sync coordinator would notify the same component to allow the I/O commands to be processed, although such a configuration is not required. After the one or more previously queued I/O commands are processed, control then flows to block 512.

At block 512, the sync coordinator halts the filtering of I/O commands. To halt the filtering of I/O commands, the sync coordinator allows I/O commands to flow through or notifies a component that filters the I/O commands to allow them to flow through. The sync coordinator might identify the I/O commands that should not be filtered anymore by one or more characteristics of the I/O commands, such as an I/O command type or an associated consistency group. The sync coordinator might identify the I/O commands based on a filter identifier or other value generated by a component when the filtering was initiated. After the sync coordinator halts the filtering of I/O commands, control then flows to block 514.

At block 514, the sync coordinator optionally modifies queued I/O command responses based on the particular coordinated action. The modification is optional because some coordinated actions might not require the I/O command responses to be modified. For example, I/O command responses that are generated after a replication error occurs might be modified to be error responses instead of confirmation responses. Error responses, on the other hand, might not be modified after a node changes to a normal state. As described at block 412 of FIG. 4, filtering and queuing I/O command responses can be optional. If the filtering and queuing of I/O command responses is not performed, there are no queued I/O command responses to modify. After the sync coordinator modifies the queued I/O command responses based on the particular coordination action, control then flows to block 516.

At block 516, one or more queued I/O command responses are optionally sent to the appropriate targets. The queued I/O command responses can be sent by the sync coordinator itself or by another component upon being notified by the sync coordinator that the I/O command responses should be sent. The appropriate targets can be clients, other nodes, etc. The halting of the filtering of I/O command responses is optional for the same reason block 514 is optional. After the one or more queued I/O command responses are sent to the appropriate target, control then flows to block 518.

At block 518, the sync coordinator halts the filtering of I/O command responses. To halt the filtering of I/O command responses, the sync coordinator allows I/O command responses to flow through or notifies a component that filters the I/O command responses to allow them to flow through. The sync coordinator might identify the I/O command responses that should not be filtered anymore by one or more characteristics of the I/O command responses (or associated I/O commands), such as an I/O command type or an associated consistency group. The sync coordinator might identify the I/O command responses based on a filter identifier or other value. The halting of the filtering of I/O command responses is optional for the same reason blocks 514 and 516 are optional. After the sync coordinator halts the filtering of I/O command responses, control then flows to block 520.

At block 520, the sync coordinator optionally sends a response to the initiator node indicating that the coordinated action has been completed. The response can include an indication of the particular coordinated action and an indication that the actions were completed. The response may be optional in some circumstances. For example, the initiator node might update statistics or logs indicating that the nodes completed the action, the amount of time taken, etc. After the sync coordinator sends a response to the initiator node indicating that the coordinated action has been completed, the process ends.

Although FIGS. 4 and 5 depict the I/O commands and responses being filtered based on one or more characteristics of the I/O commands, some configurations may already filter the I/O commands and responses appropriately, thus negating the need for filtering to be initiated. Consider a scenario in which the filtering already occurs based on a consistency group that an I/O command or response is associated with. The node might include multiple processes, one of which is responsible for a particular consistency group. Thus, the node might already filter I/O commands based on the consistency group, passing them to the appropriate process. In such a configuration, the sync coordinator might just notify the appropriate process that the I/O commands or responses it receives are to be queued, thus not requiring the initiation of the filtering.

FIG. 5 depicts the halting of the filtering as occurring after the queued I/O commands or responses are processed. Because the filtering is not halted until after the queued I/O commands or responses are processed, I/O commands and responses are still queued until the I/O commands or responses on the queue are processed. This particular configuration allows the I/O commands and responses to be processed in the order in which they were received. In some configurations, the filtering can be halted prior to the I/O commands or responses on the queue being processed.

Further, the coordinated actions depicted at blocks 504, 506, and 508 are examples of possible coordinated actions. For example, there can be multiple distinct error states or multiple distinct normal states, as described below. As another example, the primary node might replicate I/O commands in batches, as described above. These batches can be referred to as "changesets". As the secondary nodes receive the changeset, the specific I/O commands can be written to a log file. The primary node can initiate a log change after the operations associated with the changeset have been sent. In response, the secondary nodes can switch to a different log file. Any I/O commands received after the log switch are inserted into the different log file while the I/O commands in the original log file are committed. By performing the log file switch in a coordinated manner, the secondary nodes can ensure that the changesets are the same on each of the secondary nodes, maintaining synchronicity among the nodes.

The various normal and error states described herein are examples of possible states. The particular states available to a storage system, and the particular granularity at which those states are applied, can vary depending on the configuration of the storage system, node, etc. Other example states include an uninitialized, initializing, and initialized state, which might be entered into and progressed through when a node or storage system is starting up or when a new consistency group is created (or other storage object, depending on the granularity). Similarly, a terminated state might be entered into when the consistency group has been removed or the storage system is shutting down. After a consistency group has gone out-of-sync, either due to an error or as permitted by the storage system configuration, a resynchronizing state may be entered while one or more endpoints synchronize their data. Further, transitions between states can be between states that are both classified as error states or both classified as normal states. Additionally, states need not be classified into error states or normal states at all. In other words, the disclosures herein apply to coordinated transitions between any two states.

As example flowcharts, FIGS. 3-5 present operations in an example order that can be deviated from (e.g., operations can be performed in a different order than illustrated or in parallel; additional or fewer operations can be performed, etc.). For example, while FIG. 5 depicts blocks 510, 514, and 516 as occurring sequentially, the operations depicted can occur in parallel. Further, FIGS. 2 and 3 depict a loop in which individual messages are sent to multiple nodes (blocks 208, 210, and 212; blocks 314, 316, and 318, respectively). However, as described in relation to FIG. 1, broadcast messages can be used in which one message is sent to multiple nodes.

Various components described herein, such as the sync coordinator 106, are described as sending or receiving data in the form of messages, indications, etc. It should be noted that, in many instances, the sent or received data is sent or received by other components and passed to the particular component. For example, the error indication that is received by the sync coordinator 106 would be received by one or more networking components within node A 102. The error indication then flows through one or more components within node A 102 prior to being received by the sync coordinator 106. The descriptions herein, however, describe the components as sending or receiving the data without describing the intermediary steps to avoid obfuscating the disclosures.

Similarly, various data structures, such as tables and lists, are described herein. Configurations, however, are not limited to the specific data structures or solutions described. For example, a mapping table might be replaced by an array, an enumeration, a class, etc. Similarly, tables, lists, and the like might be replaced, or used in conjunction with, databases, Application Programming Interfaces (APIs), etc. Additionally, data structures may be replaced with, or used in conjunction with hard coded program code, flow control operations, etc.

As will be appreciated by one skilled in the art, aspects of the disclosures herein may be embodied as a system, method or computer program product. Accordingly, aspects of the disclosures herein may be implemented entirely as hardware, entirely as software (including firmware, resident software, micro-code, etc.) or by combining software and hardware aspects that may all generally be referred to herein as a "circuit," "module" or "system." Furthermore, aspects of the disclosures herein may take the form of a program product embodied in one or more machine readable medium(s) having machine readable program code embodied thereon.

Any combination of one or more machine readable medium(s) may be utilized. The machine readable medium may be a machine readable signal medium or a machine readable storage medium. A machine readable storage medium may be, for example, a system, apparatus, or device that uses electronic, magnetic, optical, electromagnetic, infrared, or semiconductor technology, or a combination thereof. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium does not include transitory, propagating signals.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Program code for carrying out operations for aspects of the disclosures herein may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine. Examples of a machine that would execute/interpret/translate program code include a computer, a tablet, a smartphone, a wearable computer, a robot, a biological computing device, etc.

Figure 6:
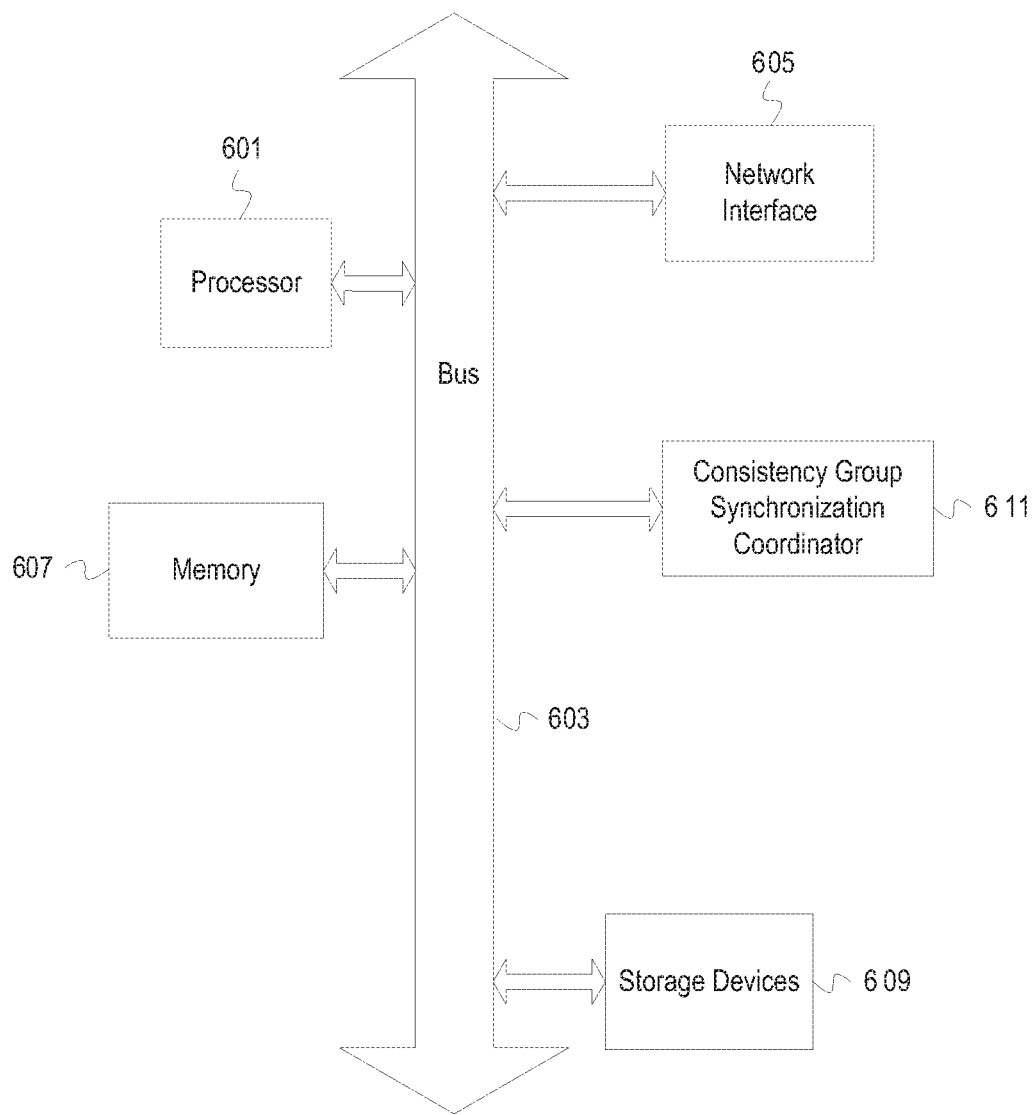
FIG. 6 depicts an example computer system including a sync coordinator.

FIG. 6 depicts an example computer system including a sync coordinator. A computer system includes a processor 601 (possibly including multiple processors, multiple cores, multiple nodes, or implementing multi-threading, etc.). The computer system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS. PRAM, etc.) or any one or more of the above already described possible realizations of machine-readable media. The computer system also includes a bus 603 (e.g., PCI, ISA, PCI-Express, HyperTransport®, InfiniBand®, NuBus, etc.), a network interface 605 (e.g., an ATM interface, an Ethernet interface, a Frame Relay interface, SONET interface, wireless interface, etc.), and a storage device(s) 609 (e.g., optical storage, magnetic storage, etc.). The computer system also includes a sync coordinator 611. The sync coordinator 611 initiates a coordinated action between nodes by requesting the availability of the nodes and indicating that the coordinated action should be performed. The sync coordinator 611 can also be operable to receive requests for availability from other nodes, prepare for the coordinated action, and perform the coordinated action. Any one of these functionalities may be partially (or entirely) implemented in hardware or on the processor 601. For example, the functionality may be implemented with an application specific integrated circuit, in logic implemented in the processing unit 601, in a co-processor on a peripheral device or card, etc. Further, realizations may include fewer or additional components not illustrated in FIG. 6 (e.g., video cards, audio cards, additional network interfaces, peripheral devices, etc.). The processor 601, the storage device(s) 609, and the network interface 605 are coupled to the bus 603. Although illustrated as being coupled to the bus 603, the memory 607 may be coupled to the processor 601.

While the examples are described with reference to various examples and exploitations, it will be understood that these examples are illustrative and that the scope of the disclosures herein is not limited to them. In general, techniques for storage system synchronization as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosures herein. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosures herein.

Use of the phrase "at least one of . . . or" should not be construed to be exclusive. For instance, the phrase "X comprises at least one of A, B, or C" does not mean that X comprises only one of {A, B, C}; it does not mean that X comprises only one instance of each of {A, B, C}, even if any one of {A, B, C} is a category or sub-category; and it does not mean that an additional element cannot be added to the non-exclusive set (i.e., X can comprise {A, B, Z}).

What is claimed is:

1. A method comprising:
    maintaining a mapping table with mappings between trigger events and coordinate actions for a sync coordinator to execute in response to the trigger events occurring, wherein a mapping within the mapping table maps a trigger event of a replication error to program code integrated within the sync coordinator for performing a coordinate action to transition a set of nodes into an error state together;
    in response to the sync coordinator receiving the trigger event comprising an error identifier indicating that replication of a consistency group from a first node to a second node failed, performing a lookup in the mapping table using the trigger event to identify the coordinate action to perform for the trigger event, wherein the mapping table indicates that the sync coordinator is to execute the program code to perform the coordinate action associated with the trigger event;
    transmitting a request, for availability to perform the coordinate action, to the first node storing a first object of the consistency group and the second node storing a second object of the consistency group; and
    in response to receiving replies to the request that the first node and the second node are capable of performing the coordinate action based upon the first node and the second node having no pending commands that conflict with the coordinate action:
        queuing, prior to executing the coordinate action, received I/O commands pending for execution upon the consistency group and acknowledgement responses pending for transmission to clients for already executed I/O commands;
        transmitting error messages instead of the acknowledgment responses to indicate that modifications, successfully committed to the consistency group by the already executed I/O commands successfully executed by the first node and successfully replicated to and executed by the second node, will be undone to preserve a write order dependency of I/O commands modifying the consistency group; and
        instructing the first node and the second node to execute the coordinate action to transition into the error state based upon the first node and the second node having no pending commands that conflict with the coordinate action.

2. The method of claim 1, comprising:
    dequeuing and failing the received I/O commands and transmitting error messages for the received I/O commands to indicate that the received I/O commands were failed.

3. The method of claim 1, comprising:
    undoing the modifications to the consistency group by the already executed I/O commands.

4. The method of claim 1, comprising:
    undoing the modifications to the consistency group by the already executed I/O commands to place the consistency group in a state before the already executed I/O commands were executed.

5. The method of claim 1, comprising:
migrating the first object from the first node to a third node based upon a reply from the first node indicating that the first node is not capable of performing the coordinate action.

6. The method of claim 1, comprising:
creating a new object to replace the first object based upon a reply from the first node indicating that the first node is not capable of performing the coordinate action.

7. The method of claim 1, comprising:
evaluating the replies to determine whether a field within the replies is set to a value matching a predetermined value indicating that the nodes can perform the coordinate action.

8. The method of claim 1, comprising:
receiving a reply from the first node indicating that the first node is not capable of performing the coordinate action because the first node has a pending coordinate action that conflicts with the coordinate action;
in response to the reply indicating that the first node is not capable of performing the coordinate action, migrating the first object from the first node to a third node to create a new object at the third node; and
instructing the third node to perform the coordinate action upon the new object.

9. A computing device comprising:
a memory having stored thereon instructions for performing a method; and
a processor coupled to the memory, the processor configured to execute the instructions to cause the processor to:
  maintain a mapping table with mappings between trigger events and coordinate actions for a sync coordinator to execute in response to the trigger events occurring, wherein a mapping within the mapping table maps a trigger event of a replication error to program code integrated within the sync coordinator for performing a coordinate action to transition a set of nodes into an error state together;
  in response to the sync coordinator receiving the trigger event comprising an error identifier indicating that replication of a consistency group from a first node to a second node failed, perform a lookup in the mapping table using the trigger event to identify the coordinate action to perform for the trigger event, wherein the mapping table indicates that the sync coordinator is to execute the program code to perform the coordinate action associated with the trigger event;
  transmit a request, for availability to perform the coordinate action, to the first node storing a first object of the consistency group and the second node storing a second object of the consistency group;
  in response to receiving replies to the request that the first node and the second node are capable of performing the coordinate action based upon the first node and the second node having no pending commands that conflict with the coordinate action:
    queue received I/O commands pending for execution upon the consistency group, prior to executing the coordinate action, received I/O commands pending for execution upon the consistency group and acknowledgement responses pending for transmission to clients for already executed I/O commands;
    transmit error messages instead of the acknowledgment responses to indicate that modifications, successfully committed to the consistency group by the already executed I/O commands successfully executed by the first node and successfully replicated to and executed by the second node, will be undone to preserve a write order dependency of I/O commands modifying the consistency group; and
    instruct the first node and the second node to execute the coordinate action to transition into the error state based upon the first node and the second node having no pending commands that conflict with the coordinate action.

10. The computing device of claim 9, wherein the coordinate action changes a current state to an error state.

11. The computing device of claim 10, wherein the instructions cause the processor to:
undo the modifications to the consistency group by the already executed I/O commands.

12. The computing device of claim 9, wherein the instructions cause the processor to:
undo the modifications to the consistency group by the already executed I/O commands to place the consistency group in a state before the already executed I/O commands were executed.

13. The computing device of claim 9, wherein the instructions cause the processor to:
migrate the first object from the first node to a third node based upon a reply from the first node indicating that the first node is not capable of performing the coordinate action.

14. The computing device of claim 9, wherein the instructions cause the processor to:
create a new object to replace the first object based upon a reply from the first node indicating that the first node is not capable of performing the coordinate action.

15. The computing device of claim 9, wherein the instructions cause the processor to:
evaluate the replies to determine whether a bit within the replies is set to a value matching a predetermined value indicating that the nodes can perform the coordinate action.

16. The computing device of claim 9, wherein the instructions cause the processor to:
receive a reply from the first node indicating that the first node is not capable of performing the coordinate action because the first node has a pending coordinate action that conflicts with the coordinate action;
in response to the reply indicating that the first node is not capable of performing the coordinate action, migrate the first object from the first node to a third node to create a new object at the third node; and
instruct the third node to perform the coordinate action upon the new object.

17. A non-transitory machine readable medium having stored thereon instructions for performing a method, which when executed by a machine, cause the machine to:
maintain a mapping table with mappings between trigger events and coordinate actions for a sync coordinator to execute in response to the trigger events occurring, wherein a mapping within the mapping table maps a trigger event of a replication error to program code integrated within the sync coordinator for performing a coordinate action to transition a set of nodes into an error state together;
in response to the sync coordinator receiving the trigger event comprising an error identifier indicating that replication of a consistency group from a first node to a second node failed, perform a lookup in the mapping table using the trigger event to identify the coordinate action to perform for the trigger event, wherein the mapping table indicates that the sync coordinator is to execute the program code to perform the coordinate action associated with the trigger event;

transmit a request, for availability to perform the coordinate action, to the first node storing a first object of the consistency group and the second node storing a second object of the consistency group;

in response to receiving replies to the request that the first node and the second node are capable of performing the coordinate action based upon the first node and the second node having no pending commands that conflict with the coordinate action:

queue received I/O commands pending for execution upon the consistency group, prior to executing the coordinate action, received I/O commands pending for execution upon the consistency group and acknowledgement responses pending for transmission to clients for already executed I/O commands;

transmit error messages instead of the acknowledgment responses to indicate that modifications, successfully committed to the consistency group by the already executed I/O commands successfully executed by the first node and successfully replicated to and executed by the second node, will be undone to preserve a write order dependency of I/O commands modifying the consistency group; and instruct the first node and the second node to execute the coordinate action to transition into the error state based upon the first node and the second node having no pending commands that conflict with the coordinate action.

18. The non-transitory machine readable medium of claim 17, wherein the instructions cause the machine to:
dequeue and fail the received I/O commands and transmitting error messages for the received I/O commands to indicate that the received I/O commands were failed.

19. The non-transitory machine readable medium of claim 17, wherein the instructions cause the machine to:
undo the modifications to the consistency group by the already executed I/O commands.

20. The non-transitory machine readable medium of claim 17, wherein the instructions cause the machine to:
undo the modifications to the consistency group by the already executed I/O commands to place the consistency group in a state before the already executed I/O commands were executed.

\* \* \* \* \*